2,813,000
REMOVAL OF HYDROGEN FLUORIDE FROM GASES

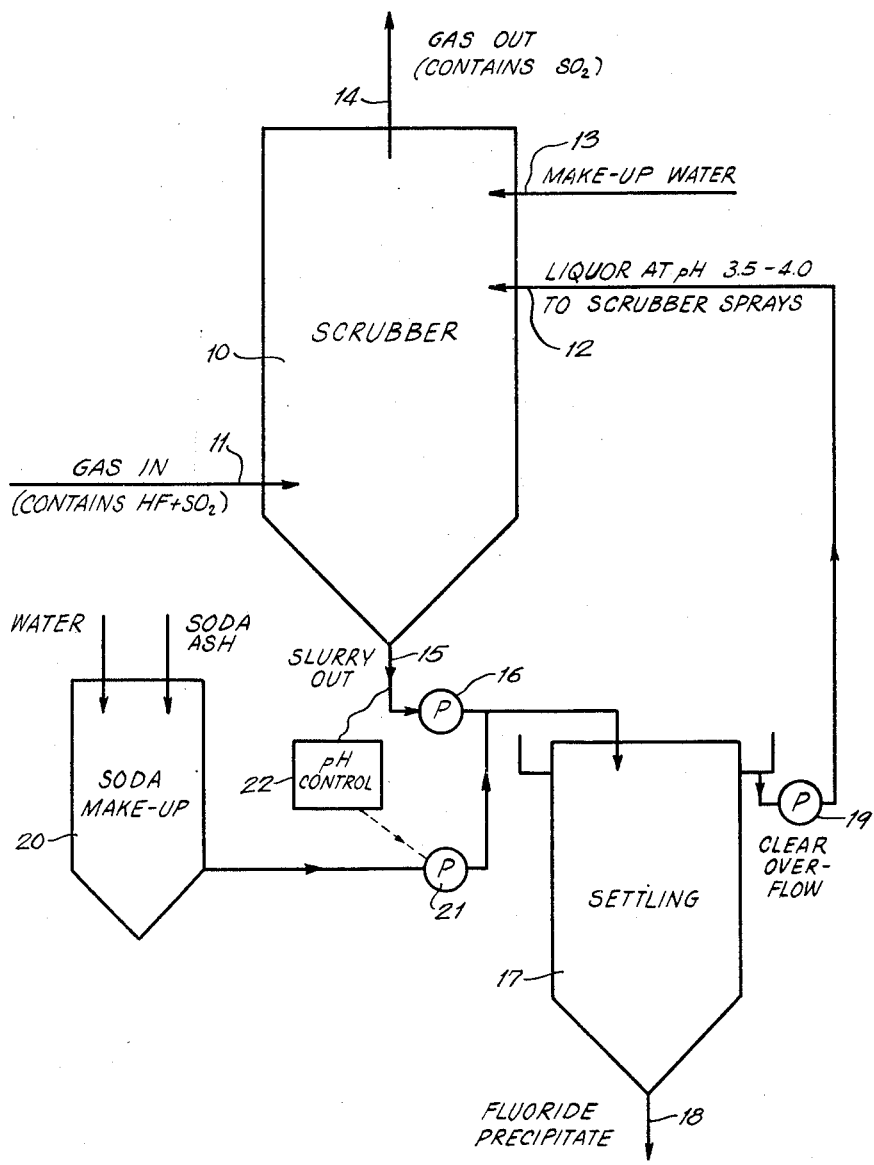

Richard C. Quittenton, Arvida, Quebec, Canada, assignor to Aluminium Laboratories Limited, Montreal, Quebec, Canada, a corporation of Canada Application March 31, 1954, Serial No. 420,167

8 Claims. (Cl. 23—2)

This invention relates to the recovery of fluorine values from gases and more particularly to the removal of hydrogen fluoride from waste gases or the like in which it is present, usually in minor proportion. A particular aim of the invention is to provide a procedure that will be highly economical and yet will permit convenient recovery of fluoride compounds for use.

In industrial processes where discharged gases contain appreciable quantities of hydrogen fluoride, it is usually desirable to treat the gas for removal or reduction of the hydrogen fluoride content, both because the release of such substance at rates above a selected minimum may sometimes be objectionable as detrimental to animal or other life, and because valuable fluorides can be recovered by such treatment. For example, scrubbing procedures have commonly been used for reducing the hydrogen fluoride content of the gases withdrawn from or over aluminum reduction cells, i. e. in plants where metallic aluminum is produced by electrolysis of a fused bath containing alumina.

Among various known methods for such treatment of gases, scrubbing with large quantities of plain water can be fairly effective in reducing the hydrogen fluoride content. Since in such case the dissolved fluoride can only be made to reach a relatively low concentration, its actual recovery from the scrubbing water is usually too costly for practical purposes. Another method has involved the use of solid basic substances such as lime packed in towers, but operations of this type have not appeared efficient for treatment of aluminum reduction cell gas (so-called potroom gases), a particular difficulty being of a physical nature in handling the gas, i. e. because of the back pressure involved in trying to drive it through the packed towers.

A third practice, perhaps the most common, has been to scrub or react the gas with an alkaline solution, such as an alkaline solution of sodium carbonate or other base or basic salt. Good removal of hydrogen fluoride from the waste gases is obtained, and the process permits ultimate recovery of fluoride as the sodium or other salt corresponding to the alkaline compound employed. One mode of operation, for instance, is to permit the fluorine salts to build up to a relatively high value in solution in the alkaline scrubbing liquor. Then after filtering to remove carbon and miscellaneous other solids which were carried by the gases, the clear solution is treated in so-called gassing towers, where carbon dioxide is applied. This treatment, which acidifies the solution, causes precipitation of the fluoride salts, e. g. as sodium fluoride, or if sodium aluminate has been added, as cryolite.

While these alkaline scrubbing processes are effective, they have been rather expensive when used in certain industries such as aluminum reduction plants. The potroom gases of the latter not only contain hydrogen fluoride, other gases such as carbon monoxide and dioxide, some solids or dust, e. g. alumina and carbon, and perhaps other fluorides in gaseous or solid form, but also very commonly include sulfur dioxide in amount comparable to the fluorine (or HF) content, indeed often up to two or more times the quantity of the latter. The sulfur dioxide is taken up very thoroughly by the scrubbing solution, utilizing large amounts of soda or other alkali, up to several times the amount required by the HF, in the formation of sulfite or sulfate salts. This heavy consumption of soda is a serious waste, since the resulting sulfites or sulfates are of insignificant value for recovery, as compared with the fluorides. Furthermore, the large concentration of sulfates or the like in the scrubbing liquor correspondingly complicates the ultimate fluoride separation, e. g. in being one of the reasons for requiring the expensive $CO_2$ gassing step.

The present invention is therefore designed to provide a more economical and efficient method of fluorine removal and recovery, especially by reducing the excess consumption or loss of alkaline reagent in the handling of gases containing significant amounts of sulfur dioxide. For the attainment of improvement in the foregoing and other important respects, the new process of the invention involves, as an essential step, the scrubbing or other treatment of the fluoride-containing gas with an aqueous solution that is maintained in an acid condition, e. g. at a suitable pH below 6, and that nevertheless has a continuing content of soda (sodium carbonate), or sodium aluminate or indeed any soluble base or non-fluorine bearing salt which will react with hydrogen fluoride in water to form a non-gaseous product. A particularly important feature of this acid scrubbing process resides in the discovery: (1) that the free (uncombined) hydrogen fluoride content of the solution can and should be kept no higher than a readily determinable amount for which the HF equilibrium concentration in the scrubbed gas is at or below the reduced HF value sought; and (2) that this condition can be achieved by taking up the dissolved HF with the fluoride-reactive substance (i. e. the neutralizing ions) in the solution, while restricting the concentration of such substance to keep the pH at or within a correspondingly selected value or range, preferably below 5.5.

It has been found that under these circumstances, i. e. by utilizing an acid (rather than an alkaline) scrubbing liquor while neutralizing the absorbed hydrogen fluoride continuously to keep its free concentration below a selected value, the simultaneous absorption of sulfur dioxide is reduced to a relatively low, indeed very minor extent. Thus in effect hydrogen fluoride is separated from the gas selectively relative to sulfur dioxide, with consequent saving in use of soda or other reagent; in many cases, the reagent requirement is only a minor fraction of what is needed for conventional alkaline scrubbing. At the same time, high efficiency of fluoride removal is easily achieved, and recovery of fluoride from the solution is greatly facilitated, being in many cases essentially automatic, with no need for the gassing towers heretofore employed.

In carrying out the process, the waste gases, for example after removal of solids, are passed through a srubber where they are brought into intimate and extended contact with the liquid, e. g. in sprays of conventional character. From the beginning, the liquor is made to contain a certain proportion of the neutralizing or fluoride-reacting material, such as sodium carbonate, preferably in amount insufficient to provide a strongly alkaline pH even before any HF is absorbed. As the hydrogen fluoride dissolves in successive quantities of the liquid, the concentration of soda is promptly reduced by reaction, as by forming sodium fluoride, and dissolved hydrogen fluoride tends to build up, depressing the pH. The process is advantageously continuous with the liquor recirculated and soda added continuously or from time to time as may be necessary to keep the pH in a desired range, usually about 3.5 to 4.0.

Under the acid conditions of the liquor, the sodium fluoride has only a relatively low solubility so that it soon commences to precipitate out. Thus in normal operation with soda as the reagent, the discharge from the scrubber will consist of a slurry, the solids being chiefly sodium fluoride. The recirculating system may include a settling tank, where these solids are removed, while the clear liquor returns to re-enter the scrubber as spray. Although a certain concentration of dissolved sulfur dioxide is built up and maintained in the liquor, it is essentially a saturation value and relatively little sulfur dioxide is reacted to yield sulfites or sulfates in solution. In consequence the actual take-up of sulfur dioxide from the waste gases is relatively minor, once the described saturation of dissolved $SO_2$ has been reached. As the process continues, there can be conveniently continuous removal of sodium fluoride or other desired fluoride. Soda solution and make-up water are added as necessary, the soda addition being preferably limited or controlled by a single factor, namely to keep the soda content as high as possible while maintaining an acid pH. Preferred control is to maintain or approximate a selected pH, chosen in the range from above 1 or 1.5 up to 5.5.

As will be further explained, other fluoride compounds can be prepared directly in the present process by using other basic salts or reactants in the scrubbing liquid, or by appropriate subsequent treatment of the recovered solids. The efficiency of HF removal is satisfactorily high, while the reagent consumption is low and thus very economical, the latter result being occasioned, as will now be seen, by the desirably low efficiency of $SO_2$ removal.

It is believed that the demonstrated effectiveness of the process can be attributed to the novel correlation of certain significant factors, as follows. Thus in the first place, it has been found that hydrogen fluoride is about three thousand times as soluble as sulfur dioxide in water. For intance, vapor-liquid equilibrium data for hydrogen fluoride and water show that with the gas at 760 mm. pressure and zero degrees centigrade, the dissolved HF concentration is of the order of 1 to 5 grams per liter where the equilibrium vapor concentration of hydrogen fluoride over the liquid is of the order of 0.1 to 3.0 milligrams per cubic foot. Thus with the water at 40° C., the vapor concentration of HF is 0.5 mg. per cubic foot over water containing about 2.5 grams of HF per liter, and to reduce the vapor concentration to 0.1 mg. per cubic foot, the dissolved concentration must be kept to about 0.5 gram per liter or less. Similar curves are obtained for other temperatures of the liquid; thus for 0.5 mg. of HF per cubic foot in the gas, the equilibrium concentration of dissolved HF is about 1 gram per liter at 60° C. and about 7 grams per liter at 25° C.

On the other hand, the solubility of sulfur dioxide is much less: for an equilibrium concentration of 1 gram of $SO_2$ per liter in water solution, the vapor concentration (same conditions) is 500 mg., 800 mg. and about 1300 mg. per cubic foot over water at 30° C., 40° C. and 50° C. respectively. Likewise to reach a dissolved concentration of even 0.2 grams of sulfur dioxide per liter, the equilibrium vapor concentration is from about 70 to 140 milligrams per cubic foot. While these figures show that hydrogen fluoride is many times more soluble than sulfur dioxide, the removal of hydrogen fluoride by water absorption alone is uneconomical, in that the dissolved HF concentration is nevertheless too low for efficient subsequent recovery. If, however, an alkaline solution is utilized to increase the fluoride absorption, the sulfur dioxide is also avidly taken up by reaction with the base and the difference in solubility of the gases has no useful effect; the only significant result is the conversion of both HF and $SO_2$ to corresponding salts, rather than the limitation of either HF or $SO_2$ to its presence in the free dissolved state alone.

In the present process the scrubbing liquid contains a neutralizing reagent but is maintained at an acid rather than an alkaline pH. It has been found that under these circumstances the hydrogen fluoride continues to react significantly while the sulfur dioxide reacts relatively very little with the neutralizing compound. Thus the $SO_2$ take-up tends to be limited, in fact, by the low solubility of such gas in the free state compared to the solubility of HF, while at the same time the removal of the HF is vastly enhanced by chemical absorption.

That is to say, by restricting the amount of alkaline material present so that there is never enough or never more than enough to react with the hydrofluoric acid available, there is relatively small opportunity for $SO_2$ absorption by chemical reaction. Indeed such absorption is specifically limited in the presence of free, dissolved hydrogen fluoride, since fluorine or fluorine ions (as in HF) will tend to displace $SO_2$ from any salt which the latter tends to form. In consequence the alkaline or neutralizing material is consumed preferentially by the HF and any continuing $SO_2$ pick-up in the process is essentially limited to no more than is occasioned by the fresh water make-up in recirculation. A highly efficient separation of hydrogen fluoride is therefore achieved, and likewise continuous conversion of the fluoride values to reclaimable form, while the absorption efficiency for sulfur dioxide is kept desirably low and reagent consumption is restricted to about the actual requirements of fluoride recovery.

The accompanying drawing is a diagrammatic view of a system of apparatus, providing a flow diagram of one example of the process.

While other arrangements and sequences of steps can be used, the system shown affords an effective mode of operation, utilizing a spray-type scrubber 10 and other associated instrumentalities, which may all be of conventional construction and are therefore not illustrated in detail. The waste or other gas to be treated enters the scrubber 10 at the inlet 11, and contains both hydrogen fluoride and sulfur dioxide. The treating liquid, containing some HF from previous circulation and containing soda (sodium carbonate) in amount insufficient to raise the pH above 5.5, but usually enough to reach a pH of about 3.5 to 4.0, is supplied to the scrubber sprays at 12, as likewise make-up water (at 13) to replace evaporation losses. The acid liquor absorbs hydrogen fluoride from the gas, selectively relative to sulfur dioxide as explained above, and the scrubbed gas is discharged at 14. The absorbed HF appears in the liquor, (a) in part as a greater dissolved concentration (lowering the pH), and (b) usually in greater part in reacted form, e. g. as sodium fluoride. Since the solubility of the latter is very low in these acid ranges of pH, it in effect precipitates as it forms, so that the liquid discharged at 15 from the scrubber is a slurry.

The slurry is conducted, as by a pump 16, to a settling tank 17 from which the precipitated fluoride, e. g. NaF, can be withdrawn at the bottom 18 while a pump 19 continuously returns the overflow, i. e. the clear liquor, to the scrubber at 12. Make-up soda solution from a supply tank 20 is added continuously or intermittently to the recirculating line by a pump 21, at any convenient point; for example, the soda can be effectively added to the slurry passing to the settling tank, with some advantage of precipitating further fluoride for separation before recirculation of the liquid through the scrubber. As explained, the soda addition need only be controlled to maintain a desired pH or pH range in the liquid, and thus in many cases can be regulated automatically, as by a suitable pH controller 22 which is responsive to the condition of the slurry leaving the scrubber at 15 and which adjusts the pump 21 or other flow control means so that the rate of soda addition is just sufficient to restore the pH to the value desired at 12. For instance, in a typical operation wherein it is desired to scrub the gas with liquid at pH 3.5 to 4.0, the slurry effluent from the scrubber may show a pH of 1.0, due to the expected absorption of HF by solution and reaction. The controller 22 then sets the rate of soda addition at a point which will raise the pH, say, to 4.0 in the slurry and therefore in the clarified solution returned to constitute the scrubber spray. In some instances the scrubbing solution may be highly buffered so that automatic pH control by known methods is difficult. In those situations, resort may be had to analytical control by titration for free acid.

In many cases the pH control need not be very precise. Indeed liquids having a pH approaching the lower limit of about 1.0 may still exhibit some scrubbing efficiency for HF, while even at a pH as high as 5.5 the liquid is sufficiently acid for significant suppression of $SO_2$ absorption. Best results, however, are usually achieved by endeavoring to keep the liquid, which is presented to the gas, at a selected value or range above 1.5 and below 5.0, present evidence being that a most effective operating point is the range of 3.5 to 4.0 or 4.5.

In general, actual operating conditions can be varied to suit the circumstances and the results desired. With the present process, high scrubbing efficiencies for hydrogen fluoride, measured as percentage of fluorine removed, are readily obtainable in most cases, i. e. an efficiency of 90% or more. The actual content of HF remaining in the gas after a scrubbing treatment depends, however, on the initial concentration as well as on the efficiency; whether in a given case a single scrubbing stage is adequate for safety in the ultimate release of gas to the atmosphere or whether one or more additional scrubbing stages will be needed, depends also, of course, on the total rate of gas discharge. The present description is directed simply to a single-stage continuous operation, as being usually sufficient, or indeed as illustrating each step in a sequence where such is necessary.

The process is effective over a wide range of hydrogen fluoride concentrations in the gas, successful tests having been made with gases containing as little as 0.4 to 1.5 milligrams of fluorine per cubic foot (at normal temperature and pressure), and as high as 10 to 60 milligrams of fluorine per cubic foot. For efficiencies of 90% or better, i. e. to reduce the fluorine content to one-tenth or less of its initial value in the exit gas, the permissible free HF concentration in the liquor may correspondingly vary. Thus if the exit vapor concentration is to be less than 0.1 mg. per cubic foot, the free HF content in the liquor should not exceed about 0.5 grams per liter at 40° C. For inlet gas at the higher end of the concentration range mentioned above, good scrubbing efficiency (not more than 3.0 mg. of fluorine per cubic foot in the exit gas) can be obtained with free HF concentrations up to 5 grams per liter in the liquor. The liquor temperature should be kept reasonably low, usually in the range of 20° to 60° C., and preferably not more than about 45° C. when a gas relatively dilute in HF is under treatment. As indicated, the required acid condition of the liquor is achieved by maintenance of a small but definite free HF concentration at all times; for example, such concentration can range from 0.1 to 0.5 grams per liter (or sometimes up to 2 g. p. l.) where the treated gas contains only about 1 mg. of hydrogen fluoride per cubic foot, and can be from 0.2 to 5.0 grams per liter for gases of substantially greater fluoride content, e. g. up to 60 mg. per cubic foot.

While acid scrubbing for effective separation of hydrogen fluoride from a gas can be accomplished with a liquid which is primarily an aqueous solution of any substance that is at least somewhat water soluble, that reacts with HF in water to form a non-gaseous product and that preferably gives an alkaline reaction when dissolved in pure water, a special feature of the invention is the use of a substance such as sodium carbonate as the neutralizing reagent. Not only is sodium carbonate particularly effective for the described purpose and especially for production of the corresponding fluoride which eventually precipitates out as it forms, but there is no build-up of undesirable constituents in the liquor, i. e. in that the carbonate ion disappears on reaction. Excellent results are similarly obtained with sodium aluminate, and other substances of like utility are soluble carbonates and hydroxides, for example of alkali metals (including ammonium), the carbonates and aluminates being preferable as more conveniently susceptible of the desired pH control.

In some instances materials such as aluminum hydroxide (in the form of so-called alumina gel) can be employed, and also calcium or magnesium carbonates, although there is apt to be some procedural inconvenience in the use of substances having limited or little solubility. Other alkaline salts can be employed in an acid scrubbing process, although such salts may lack the special advantages of sodium carbonate and the like and may therefore allow accumulation of undesired radicals or anions, which complicate or impede ultimate recovery of fluoride. Such compounds, however, may nevertheless be useful, at least where the primary concern of the process is to purify the gas of its hydrogen fluoride content, with less regard for economical recovery of uncontaminated fluoride. Examples of such alkaline salts are phosphates and borates, especially alkali metal or other soluble compounds of this type.

As will be appreciated, the selection of the neutralizing reagent in the preferred type of operation may be somewhat dictated by the nature of the fluoride compound sought to be directly recovered; with sodium carbonate, for example, the immediate precipitated product is usually sodium fluoride, while cryolite or aluminum fluoride can be made directly by incorporating sodium aluminate or aluminum hydroxide, respectively, in place of soda.

Subsequent treatment of the separated sodium fluoride or other fluoride material can be relatively simple, there being usually no need for the carbon dioxide gassing operation heretofore required with the liquor from alkaline scrubbing. As indicated above, cryolite or other aluminum-containing fluoride can be produced directly if desired, or if greater convenience is achieved by the use of soda in the scrubbing liquor, and yet such compounds are ultimately sought, the sodium fluoride can be suitably treated as precipitate or in solution, e. g. by reaction with aluminate, to yield the desired product. As will be appreciated, the nature of the further recovery treatment, which is not an essential part of the present invention, may vary, too, with the purity of the separated precipitate or solution. For example, if solids in the waste gas have been removed before scrubbing, the present process may be employed to yield a relatively pure precipitate of sodium or other desired fluoride; alternatively, if the dust material is also accumulated in the scrubbing liquor and withdrawn with the precipitate, subsequent treatments may require dissolving the fluoride, as in the course of conversion to a different and preferred chemical form.

In one example of operation of the process, carried out on a bench scale, the gas under treatment was first filtered to remove suspended solids and was then scrubbed by bubbling through the acid liquor in a suitable tank. The gas flow was 0.3 cubic feet per minute (considered at normal temperature and pressure) and averaged 38.5 mg. of fluorine (in the form of hydrogen fluoride) and 106 mg. of sulfur dioxide, per cubic foot. Soda (sodium carbonate) was used as the reagent in the scrubbing liquor, the latter being an aqueous solution kept at a pH of 3.5 by additions of soda from time to time. Combined fluorine continuously precipitated out in the liquor, the product in this instance being sodium fluosilicate rather than sodium fluoride, because of reaction with the glass tank employed for scrubbing. Where a suitable rubberlined or other acid-proof scrubbing tank is used, the precipitate is sodium fluoride.

The test of this example was continued for approximately 90 hours, and resulted in an over-all fluorine recovery efficiency of 95.5%, with a soda consumption totaling 130.5 grams and equivalent to 2.03 tons of soda per ton of fluorine recovered. The sulfur dioxide scrubbing efficiency was desirably low, i. e. 30.2%. The saturation concentrations reached in the clear scrubber liquor were 3.5 grams of fluorine per liter and 4 grams of $SO_2$ per liter, while the average content of fluorine and $SO_2$ in the exit gas from the scrubber amounted respectively to 1.7 and 74 mg. per cubic foot. During this actual run, soda was added at an average rate of 24.6 mg. per minute, it being understood that in preferred practice the control need be related only to the pH of the liquor, and need not require any specific predetermination of the amounts of soda added or present. While in the relatively short time of this test operation, the actual distribution of total absorbed fluorine was 44.5 grams in the clear liquor (partly as free HF but mostly as dissolved fluoride salt) and 19.6 grams in the recovered solids, it will be understood that over a long-continuing run of this type of operation, the principal, and indeed effective recovery of fluorine is in the solids, usually as precipitated in the scrubber or in the course of recirculation of liquor leaving the latter.

As will be seen, the test showed a desirably high efficiency of hydrogen fluoride scrubbing, with relatively small reagent waste in removing sulfur dioxide, the large preponderance of the latter being carried through without absorption. The soda consumption of about 2 tons per ton of recovered fluorine is remarkably low in comparison with prior alkaline scrubbing operations, in which 5.5 tons of soda have been required per ton of fluorine recovered in the clear liquor.

Another example of the process is represented by a plant scale test, which was carried out for 8 hours with a conventional acid-proof scrubber. The liquor (primarily an aqueous solution of sodium carbonate) was fully recirculated, while a pH of about 4.8 was maintained, with appropriate extra soda. The hydrogen fluoride content of the gas treated was about 7 to 13 milligrams per cubic foot, and the free HF concentration in the scrubbing liquor was effectively controlled at not more than about 2.5 grams per liter, i. e. thus to prevent the equilibrium concentration of HF in the scrubbed gas from exceeding about 10% of its value in the original gas. During the 8 hour run, the total fluorine entering the scrubber in both gas and dust was about 400 pounds, with a total of only about 23 pounds of fluorine leaving the scrubber; a total of 368 pounds of fluorine was recovered, being 194 pounds in the liquor and 174 pounds in the scrubber solids. The fluorine concentration in the liquor built up to 20 grams per liter in 3 hours and remained at that value, which corresponds to the solubility limit of sodium fluoride, for the remaining time; thus as indicated above, after equilibrium conditions are reached in the scrubbing circuit, actual removal and recovery of fluoride is essentially confined to its precipitation as sodium fluoride or equivalent compounds.

In this plant scale test the total sodium sulfate pick-up was only 211 pounds, corresponding to an $SO_2$ removal efficiency of 26%, which represents great improvement over the undesirably high efficiency of 97% that was obtained in alkaline scrubbing procedure on similar waste gas. The total soda consumption was only a minor fraction of that required in the conventional alkaline process.

It will be understood that the above examples are merely illustrative and that the process is applicable to a wide variety of circumstances, for separation of hydrogen fluoride, and especially for economical separation and recovery of fluoride from gases which also contain substantial quantities of sulfur dioxide. While in the presently preferred operations described above the fluorine recovery has been emphasized as involving direct precipitation of sodium fluoride or the like, it will be understood that the liquor always builds up to a saturation concentration of dissolved sodium fluoride; in continuing the above specific process utilizing soda as reagent this dissolved fluoride salt concentration simply remains and at most only contributes in a transient sense to the continuing fluoride recovery by precipitation. In other cases, however, e. g. especially where other reagents may be used in the scrubber liquor, considerably higher concentrations of dissolved fluorine salts may possibly be reached (as distinguished from dissolved, free HF), and the recirculating process may then conceivably include special precipitating or equivalent steps for reducing the fluorine salt content, i. e. for separating and recovering the desired product.

It is to be understood that the invention is not limited to the specific embodiments herein shown and described but may be carried out in other ways without departure from its spirit.

I claim:

1. A process of removing hydrogen fluoride from aluminum reduction cell gas which contains combined fluorine that consists essentially of hydrogen fluoride, and which also contains sulfur dioxide in significant amount, comprising scrubbing the aforesaid gas with aqueous liquid which is subjected to recirculation for succeeding scrubbing operations, said liquid being a dilute acidic solution having a pH in the range of 1.0 to about 5.5 in which the acidic component consists essentially of dissolved hydrogen fluoride and in which an alkaline neutralizing agent has been introduced, introducing successive quantities of alkaline neutralizing agent into said liquid in the course of recirculation to maintain said liquid at a pH within the aforesaid range during the scrubbing operations, said introductions of neutralizing agent into the liquid and said operations of scrubbing the aforesaid cell gas with the liquid being performed to convert hydrogen fluoride from said gas into the form of fluoride salt in said liquid, said fluoride salt being a reaction product of said neutralizing agent and hydrogen fluoride, and treating successive quantities of the liquid to recover fluoride therefrom, for removal of fluoride salt from the course of recirculation, said process including sufficiently limiting the introductions of neutralizing agent and maintaining sufficient concentration of dissolved hydrogen fluoride by absorption from the gas, to keep the pH of the liquid substantially no higher than the aforesaid range, for inhibiting absorption of sulfur dioxide in the liquid.

2. A process as described in claim 1, wherein the alkaline neutralizing agent comprises a soluble alkaline salt of an alkali metal.

3. A process as described in claim 1, wherein the alkaline neutralizing agent comprises sodium carbonate.

4. A process as described in claim 1, wherein the alkaline neutralizing agent comprises sodium aluminate.

5. A process as described in claim 1, wherein the alkaline neutralizing agent comprises sodium carbonate, reacting in the scrubbing liquid to precipitate sodium fluoride, the introductions of neutralizing agent into the liquid being controlled to provide a pH at least as high as about 3 in the liquid as it enters the scrubbing operation, and the treatment of successive quantities of the liquid to recover fluoride comprising separating precipitated sodium fluoride from the recirculating liquid intermediate successive scrubbing operations.

6. A process as described in claim 1, wherein the introductions of neutralizing agent are controlled to maintain a pH in the liquid within the range of about 1.5 to about 5 during the scrubbing operations.

7. A process of removing hydrogen fluoride from aluminum reduction cell gas which contains combined fluorine that consists essentially of hydrogen fluoride, and which also contains sulfur dioxide in significant amount, comprising scrubbing the aforesaid gas with aqueous liquid which is subjected to recirculation for succeeding scrubbing operations, said liquid being a dilute acidic solution having a pH in the range of 1.0 to about 5.5 in which the acidic component consists essentially of dissolved hydrogen fluoride and in which has been introduced an alkaline agent selected from the class consisting of alkali metal aluminates and the carbonates and hydroxides of alkali metals, aluminum, calcium and magnesium, introducing successive quantities of the alkaline agent into said liquid in the course of recirculation to maintain said liquid at a pH within the aforesaid range during the scrubbing operations, said introductions of alkaline agent into the liquid and said operations of scrubbing the aforesaid cell gas with the liquid being performed to convert hydrogen fluoride from said gas into the form of fluoride salt precipitating in said liquid, said fluoride salt being a reaction product of said alkaline agent and hydrogen fluoride, and separating successive quantities of said precipitated fluoride salt from the recirculating liquid intermediate successive scrubbing operations, the aforesaid introductions of alkaline agent being limited to keep the pH of the liquid substantially no higher than the aforesaid range, for inhibiting absorption of sulfur dioxide in the liquid.

8. A process as described in claim 7, wherein the introductions of alkaline agent into the liquid are controlled to provide a pH as high as about 3 in the liquid as it enters the scrubbing operation.

References Cited in the file of this patent

UNITED STATES PATENTS

| | | |
|---|---|---|
| 1,324,030 | Bowman | Dec. 9, 1919 |
| 1,464,990 | Howard | Aug. 14, 1923 |
| 2,031,554 | Torchet | Feb. 18, 1936 |
| 2,231,309 | Weber | Feb. 11, 1941 |
| 2,385,208 | Jones | Sept. 16, 1945 |
| 2,597,302 | Dale | May 20, 1952 |